(12) United States Patent
Prakash

(10) Patent No.: US 6,931,597 B1
(45) Date of Patent: Aug. 16, 2005

(54) INDICATIONS OF SECURED DIGITAL ASSETS

(75) Inventor: Nalini J. Prakash, San Carlos, CA (US)

(73) Assignee: PSS Systems, Inc., Mountain View, CA (US)

( * ) Notice: Subject to any disclaimer, the term of this patent is extended or adjusted under 35 U.S.C. 154(b) by 646 days.

(21) Appl. No.: 10/124,179

(22) Filed: Apr. 17, 2002

(51) Int. Cl.[7] .................................................. G06F 3/00
(52) U.S. Cl. ...................... 715/741; 715/768; 715/824; 380/45; 713/166
(58) Field of Search .............................. 715/741–743, 715/772, 768, 821–824, 859, 861, 976, 977; 713/166; 380/45

(56) References Cited

U.S. PATENT DOCUMENTS

| | | | |
|---|---|---|---|
| 5,220,657 A * | 6/1993 | Bly et al. .................. 711/152 |
| 5,570,108 A * | 10/1996 | McLaughlin et al. ........ 715/823 |
| 5,689,718 A * | 11/1997 | Sakurai et al. ............... 715/517 |
| 5,729,734 A * | 3/1998 | Parker et al. ................... 707/9 |
| 5,751,287 A * | 5/1998 | Hahn et al. .................. 715/775 |
| 5,821,933 A * | 10/1998 | Keller et al. ................. 715/741 |
| 6,608,636 B1 * | 8/2003 | Roseman ..................... 715/753 |
| 6,633,311 B1 * | 10/2003 | Douvikas et al. ........... 715/731 |
| 6,834,341 B1 * | 12/2004 | Bahl et al. ................... 713/156 |
| 2002/0124180 A1 * | 9/2002 | Hagman ..................... 713/200 |
| 2004/0041845 A1 * | 3/2004 | Alben et al. ................. 345/846 |

* cited by examiner

Primary Examiner—Kristine Kincaid
Assistant Examiner—Le Nguyen
(74) Attorney, Agent, or Firm—Carr & Ferrell LLP

(57) ABSTRACT

Techniques for indicating secured files among other files in a graphic operating system are disclosed. According to one aspect of the techniques, each file has a standard or default icon to be associated with. When one of files in a selected place is detected in a secured format, a visual object is retrieved to be overlaid upon a default icon of the file without obscuring the original meaning or indication of the default icon.

35 Claims, 9 Drawing Sheets

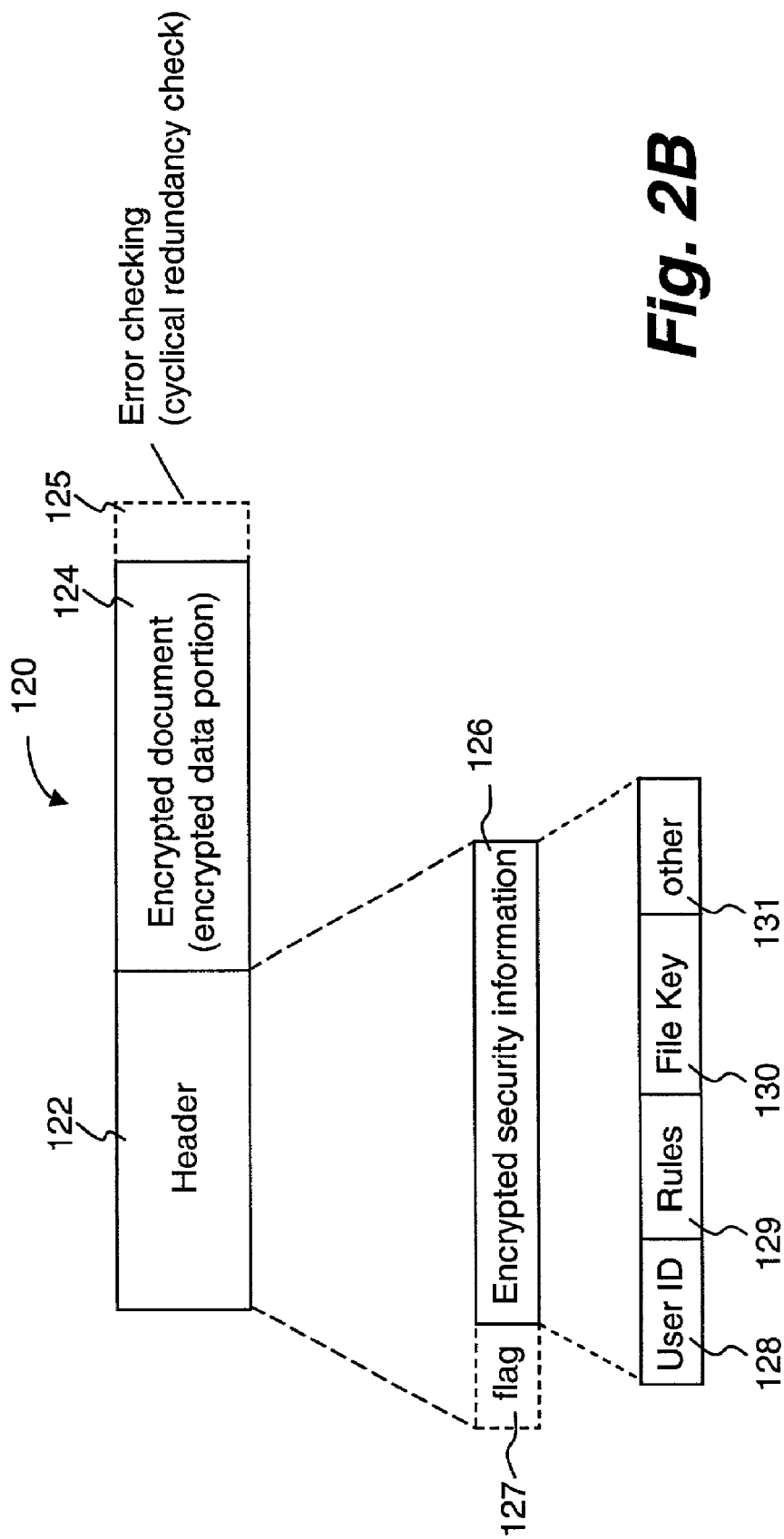

```
<header>
  <header_version>
    1.0
  </header_version>
  <key_blocks_list>
    <key_blocks_list_version>
      1.0
    </key_blocks_list_version>
    <key_block>
      <key_block_version>
        1.0
      </key_block_version>
      <group_id> www.xyz.com/marketing </group_id>
      <** /* encrypted with Marketing's public-key */
        <group_id> www.xyz.com/marketing </group_id>
        <crypto>
          <dek_mat>P39GJ439833IOOE93I5UR93U3945U439</dek_mat>      ─── 170
          <enc_algo>
            <name>
              RIJNDAEL
            </name>
            <key_size> 256 </key_size>
            <block_size> 128 </block_size>
          </enc_algo>
          <ses_enc_block_size> 4096 </ses_enc_block_size>
        </crypto>
      **>
```
{ 167

166

```
      </key_block>
      <key_block>
        <key_block_version> 1.0 </key_block_version>
        <group_id> www.xyz.com/engineering </group_id>
        <** /* encrypted with User1_Trivial_Group's public-key */
          <group_id> www.xyz.com/engineering </group_id>
          <crypto>
            <dek_mat>P39GJ439833IOOE93I5UR93U3945U439</dek_mat>   ─── 170
            <enc_algo>
              <name>
                RIJNDAEL
              </name>
              <key_size> 256 </key_size>
              <block_size> 128 </block_size>
            </enc_algo>
            <ses_enc_block_size> 4096 </ses_enc_block_size>
          </crypto>
        **>
```
{ 168

```
      </key_block>
    </key_blocks_list>
    <rule_block_list_version> 1.0 </rule_block_list_version>
    <secure-info encryption="dek" block-size="1024">
      <rule_block version="1.0">
        <group_id> www.xyz.com/marketing </group_id>
        <rule_xml_string> ... </rule_xml_string>     ─── 171
      </rule_block>
      <rule_block version="1.0">
        <group_id> www.xyz.com/engineering </group_id>
        <rule_xml_string> ... </rule_xml_string>     ─── 172
      </rule_block>
    </secure-info>
  </rule_blocks_list>
</header>
```
{ 169

*Fig. 2E*

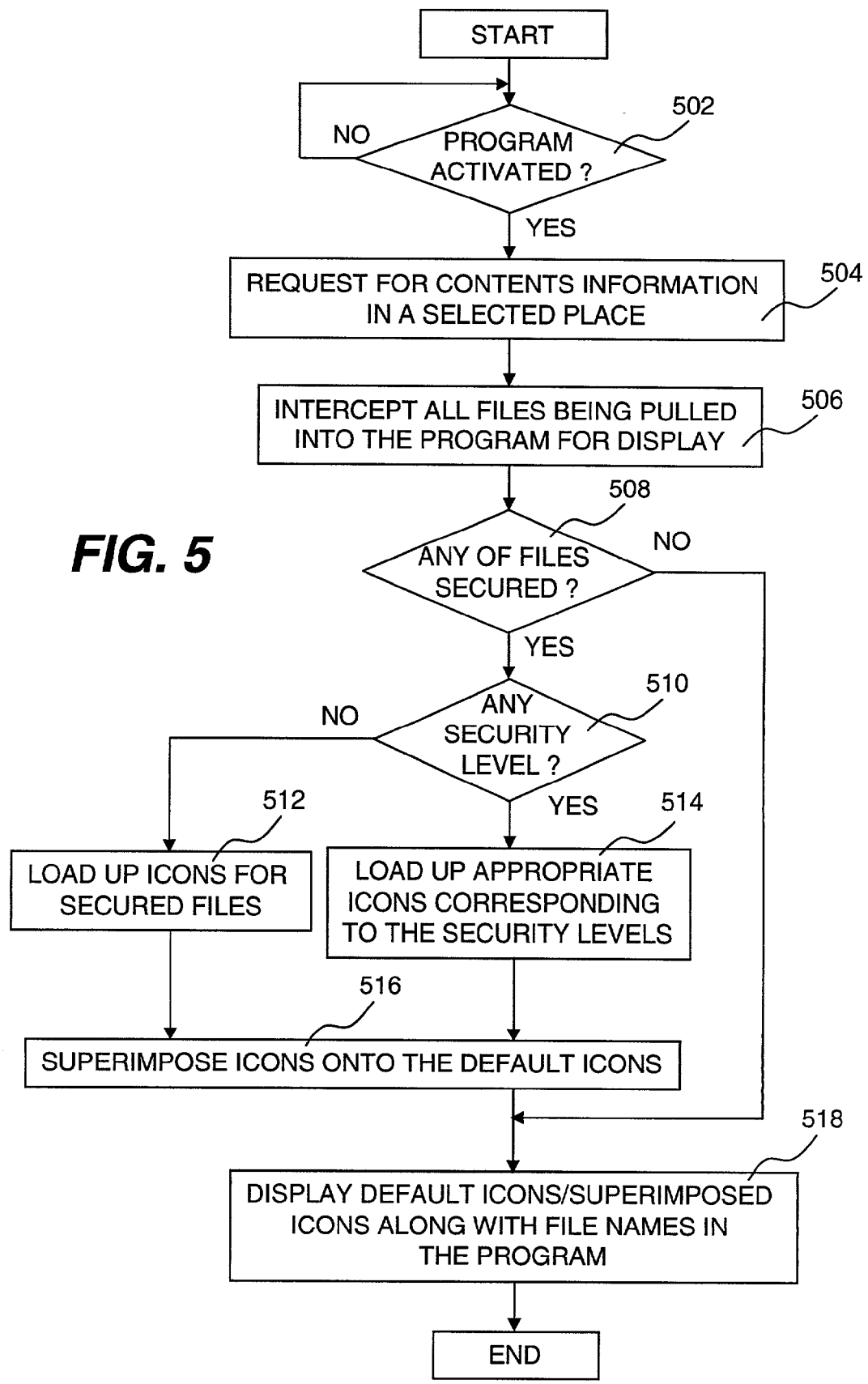

INDICATIONS OF SECURED DIGITAL ASSETS

BACKGROUND OF THE INVENTION

1. Field of the Invention

The present invention relates to the area of graphic user interface, and more particularly, relates to a method and apparatus for graphically indicating protected or secured files in a system.

2. Description of Related Art

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. It has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of networks, contractual information, customer data, executive communications, product specifications, and a host of other confidential and proprietary intellectual property remains available and vulnerable to improper access and usage by unauthorized users within or outside a supposedly protected perimeter.

There are many security means are in use. One of the commonly used methods is to apply a password to a file so that the file can only be accessed by those who know or have been told of the password. However, it is well known in the computer community that a password itself or the way the password is embedded in a file do not really deter those slightly sophisticated to break into a password protected file. In fact, there are a few dozens of tools and advices available over the Internet to break into a password protected Microsoft Word document. In a hope to ensure privacy in communications between parties, PGP (Pretty Good Privacy) scheme is commonly used to secure files that can be accessed by those whose public keys are used to encrypt the files.

To demonstrate characteristics of a file, such as a PGP file, a standard or default icon is often used. In graphic operating systems, such as Microsoft Windows 2000/XP and Mac OS X, various graphic indications of files are employed. Notably, an icon representation is allocated to correspond to a specific file, directory, window, option, or program. FIG. 1 shows an illustration 10 of seven icons under Microsoft Windows Operating Systems to indicate seven different types of objects. By looking at the respective icons, one familiar with a computing environment can readily tell what those objects are, a folder 12, an MS Word document 14, a zipped file 16, a PGP encrypted file 18, an MS Spreadsheet file 20, an MS PowerPoint presentation 22, and a PDF file 24.

One problem with the use of the PGP scheme is that a user or recipient has no idea, by looking at the icon, what an encrypted object may be till the encrypted object is decrypted or the user really gazes at the file name thereof. Essentially, files, whether they are originally created by Microsoft Word, Adobe Photoshop, or StarOffice from Sun Microsystems, after they are encrypted by PGP, the icons look all alike.

Microsoft Windows 2000 and XP (perhaps other versions) introduce a representation of encrypted files under EFS (Encrypting File System). Icons representing files encrypted under EFS remain the same but the color of the corresponding file names is no longer the same. Visually, a user can easily tell that an object associate with a distinct color is EFS secured and, at the same time, can also tell what the object is by looking at the icon.

In many systems or applications in which files are secured, a color alternation to a file name is not sufficient. In addition, a user desires to tell a level of security of the secured files before attempting to access them. Thus there is a need for techniques to efficiently indicate secured files among all other files.

SUMMARY OF INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to a method and apparatus for indicating secured files among other files in a graphic operating system. According to one aspect of the present invention, each file has a standard or default icon to be associated with. A user familiar with a computing environment can generally tell what file it is by just looking at the icon. One of the features in the present invention is to visually indicate if a file is secured or not by providing a visual object overlaid upon a default icon without obscuring the original meaning or indication of the default icon.

According to one implementation of the present invention, it is a method for graphically indicating secured items in a program for displaying contents in a selected place, wherein the program may be a Window explorer or an Internet Explorer in a Microsoft Windows operating system. The method comprises intercepting files from the selected place when the files are selected by the program for displaying the contents in the selected place, determining if there are any of the files are secured or a security level of each of the secured items (e.g., a secured document, a secured data set and etc.), wherein each of the secured items has a default icon associated with if the secured item is otherwise not secured, and superimposing an appropriate icon corresponding to the security level over the default icon without losing original indications of the default icon.

According to another embodiment of the present invention, it is a computer for displaying in a display window contents in a selected place. The computer (e.g. a desktop or laptop personal computer or a palm-sized computing device) comprises at least a processor, a first memory space for storing a client module, a second memory space, coupled to the processor, for storing code as a graphic operating system (e.g. Microsoft Windows XP), the code, when executed by the processor, causing the graphic operating system in conjunction with the client module to perform operations of retrieving all files in the selected place, checking if there is one of the secured items included in the files; wherein there is at least one, activating the client module to determine how the secured item is secured, and generating a superimposed icon to indicate the secured item is secured, different from the rest of the files when displayed in the display window.

The present invention has numerous features, benefits, advantages. One of them is to graphically indicate a secured item without obscuring an original icon associated with the item when not secured. As such, a user can readily tell what the item is and what application is associated with or can be activated to act upon.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2B illustrates an exemplary structure of a secured document including a header and an encrypted data portion;

FIG. 2E shows an exemplary header corresponding to that of the secured document structure in FIG. 1D, wherein the header includes a number of segments, some are encrypted as the security information for the secured document structure.

FIG. 5 shows a flowchart of a process for indicating graphically secured files in a selected place that may be, but not limited to, a directory, a device and a folder.

DETAILED DESCRIPTION OF THE PREFERRED EMBODIMENTS

Figure 1:
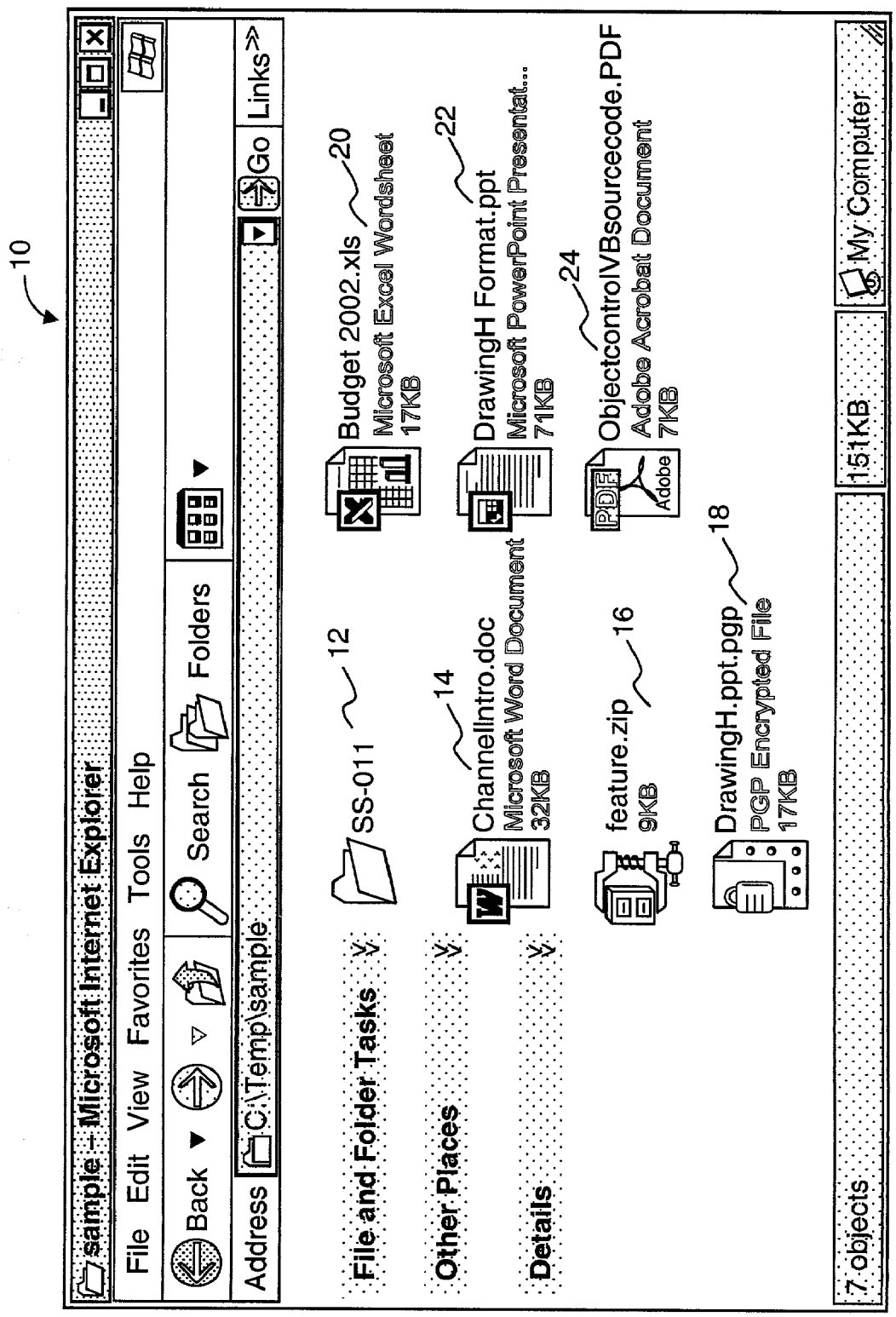
FIG. 1 shows an illustration of a display window under a Microsoft Windows Operating Systems to indicate seven different types of objects.

The present invention is related to a method and apparatus for indicating secured files among other files in a graphic operating system. According to one aspect of the present invention, each file has a standard or default icon to be associated with. A user familiar with a computing environment can generally tell what file it is by just looking at the icon. One of the features in the present invention is to visually indicate if a file is secured or not by providing a visual object overlaid upon an original icon without obscuring the original meaning or indication of the original icon.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1–5. However, those skilled in the art will readily appreciate that the detailed description given herein with respect to these figures is for explanatory purposes as the invention extends beyond these limited embodiments.

Generally, a content created by a creator for the purpose of an entity is an intellectual property belonging to the creator or the entity. In an enterprise, any kind of information or intellectual property can be content, though it is commonly referred to as "information" instead of "content". In either case, content or information is independent of its format, it may be in a printout or an electronic document. As used herein, content or information exists in a type of electronic data that is also referred to as a digital asset. A representation of the electronic data may include, but not be limited to, various types of documents, multimedia files, streaming data, dynamic or static data, executable code, images and texts.

To prevent contents in electronic data from an unauthorized access, the electronic data is typically stored in a form that is as close to impossible as possible to read without a priori knowledge. Its purpose is to ensure privacy by keeping the content hidden from anyone for whom it is not intended, even those who have access to the electronic data. Example of a priori knowledge may include, but not be limited to, a password, a secret phrase, biometric information or one or more keys.

One such secured form is created by encrypting the original electronic data according to a predetermined cipher (e.g. PGP or Pretty Good Privacy). To access a PGP encrypted file, one needs a private key (a priori knowledge) that is never revealed to anyone to decrypt the encrypted file. In certain aspect, the private key identifies the user who is accessing the PGP encrypted file. Another secured form is a scrambled video stream commonly used in video delivery systems. The video stream can be unscrambled only after it is paid for, in which case, a priori knowledge (e.g., a number) is then supplied to unscramble the scrambled video stream. In this situation, many access rules have been implicitly applied to the scrambled video stream. Examples of the access rules include a time, an authorized location, and a time period the program can be viewed. In many other applications, there are various secured forms in which different levels of (access) rules may be utilized to ensure that protected digital assets can be only accessed by authorized user(s).

Figure 2A:
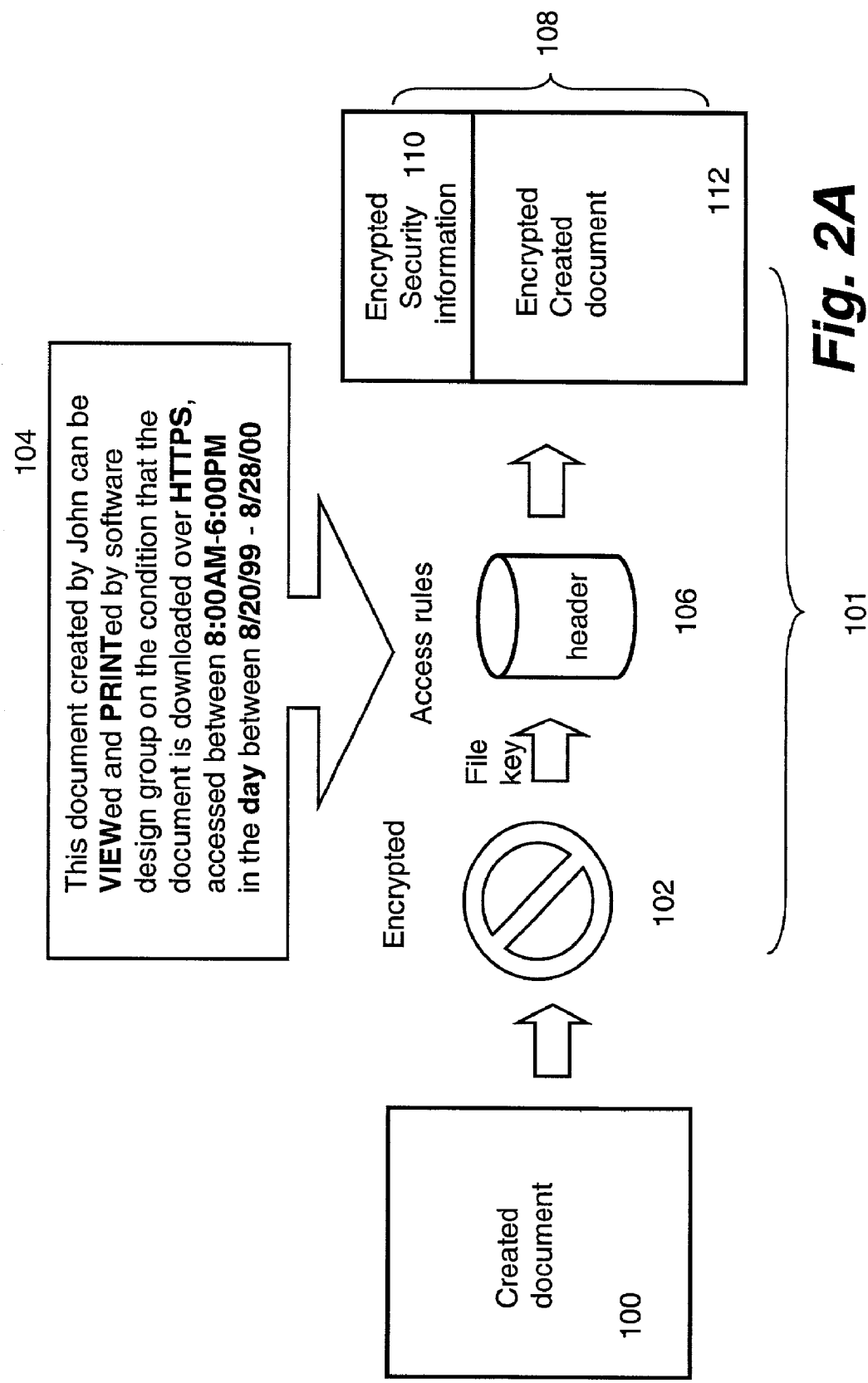
FIG. 2A shows an illustration diagram of securing a created document according to one exemplary secured file form used in the present invention.

FIG. 2A shows an illustration diagram of securing a created document 100 according to one exemplary secured file form used in the present invention. One of the purposes is to ensure that the contents in the document 100 can be only accessed by an authorized user. As used herein, the user may mean a human user, a software agent, a group of users, a device and/or application(s). Besides a human user who needs to access a secured document, a software application or agent sometimes needs to access the secured document in order to proceed forward. Accordingly, unless specifically stated, the "user" as used herein does not necessarily pertain to a human being. Regardless, it is evident that only a human user will need to see if a file is secured or non-secured when an icon of the file is displayed.

After the document 100 is created with an application or authoring tool (e.g., Microsoft WORD), upon an activation of a "Save," "Save As" or "Close" command or automatic saving invoked by an operating system, the application itself, or an application that is previously invoked, the created document 100 is caused to undergo a securing process 101. The securing process 101 starts with an encryption process 102, namely the document 100 that has been created or is being written into a store is encrypted by a cipher with a file key. In other words, the encrypted document could not be opened without the file key (i.e., a cipher key). For the purpose of controlling the access to the document, the file key or keys may be the same or different keys for encryption and decryption and are preferably included in the security information contained in or pointed to by the header and, once obtained, can be used to decrypt the encrypted document.

A set of access rules 104 for the document 100 is received and associated with a header 106. In general, the access rules 104 determine or regulate who and/or how the document 100, once secured, can be accessed. In some cases, the access rules 104 also determine or regulate when or where the document 100 can be accessed. Typically, a header is a file structure, small in size and includes, or perhaps links to, security information about a resultant secured document. Depending on an exact implementation, the security information can be entirely included in a header or pointed to by a pointer that is included in the header. According to one embodiment, the access rules 104, as part of the security information, is included in the header 106. The security information further includes the file key and, in some cases, an off-line access permit (e.g. in the access rules) should such access be requested by an authorized user. The security information is then encrypted by a cipher with a user key associated with an authorized user to produce encrypted security information 110. The encrypted header 106, if no other information is added thereto, is attached to the encrypted document 112 to generate a secured document 108.

It is understood that a cipher may be implemented based on one of many encryption/decryption schemes. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any encryption/decryption scheme that is effective and reliable may be used. Hence, the details of encryption/decryption schemes are not further discussed herein so as to avoid obscuring aspects of the present invention.

In essence, the secured document 108 includes two parts, the document itself and the corresponding security information therefor, both are in encrypted form. To access the document, one needs to obtain the file key that is used to encrypt the document and is now included in the encrypted security information. To obtain the file key, one needs to be authenticated to get a user or group key and pass an access test in which the access rules in the security information are measured against the user's access privilege (i.e. access rights).

FIG. 2B illustrates an exemplary structure of a secured document 120 including a header 122 and an encrypted data portion 124 in accordance with the secured document 108 in FIG. 1A. The header 122 includes a security information block 126 having encrypted security information that essentially controls the access to the encrypted data portion or document 124. In a certain implementation, the header 122 includes a flag 227 (e.g., a predetermined set of data) to indicate that the document 120 is secured. The security information block 126 includes one or more user IDs 128, access rules 129, at least one file key 130 and other information 131. The user IDs 128 maintain a list of authorized users who may be measured against by the access rules 129 before the file key 130 can be retrieved. The access rules 129 determine at least who and how the encrypted document 124 can be accessed. Depending on an implementation, the other information 131 may be used to include other information facilitating a secure access to the encrypted document 124, the example may include version numbers or author identifier.

To ensure that the key is not to be retrieved or accessible by anyone, the key itself is guarded by the access rights and rules. If a user requesting the document has the proper access rights that can be granted by the access rules, the key will be retrieved to proceed with the decryption of the encrypted document.

To ensure that the security information or the header (if no flag is implemented) is not readily revealed, the header itself is encrypted with a cipher. Depending on an exact implementation, the cipher for the header may or may not be identical to the one used for the document. The key (referred to as a user key) to decrypt the encrypted header can, for example, be stored in a local store of a client machine or in a server machine and activated only when the user associated with it is authenticated. As a result, only an authorized and authenticated user can access the secured document.

Figure 2C:
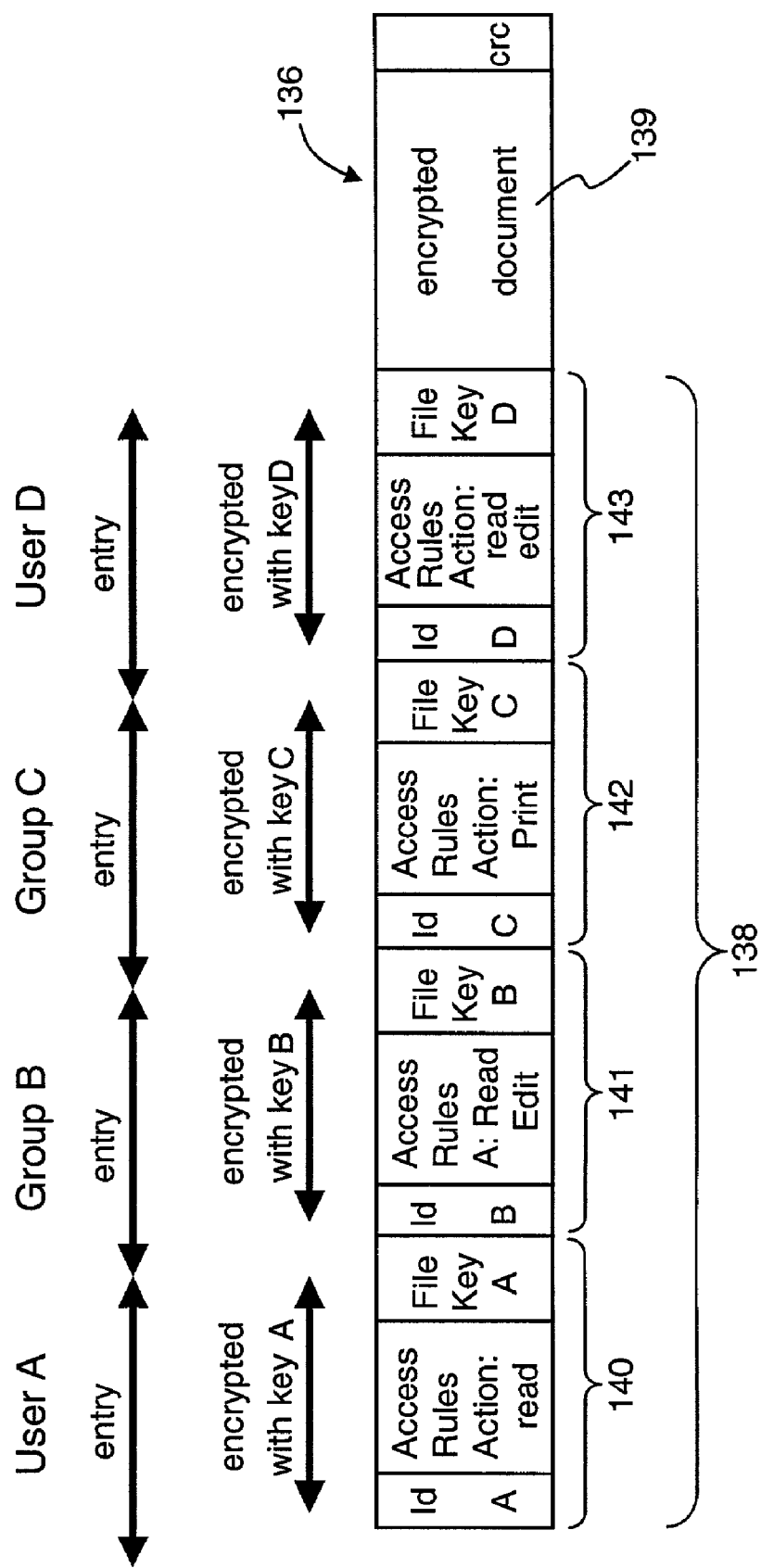
FIG. 2C illustrates another exemplary structure of a secured document including a header and an encrypted portion, wherein the header permits four different entities to access the secured document.

FIG. 2C illustrates an exemplary structure of a secured document 136 including a header 138 and an encrypted portion 139. The header 138 permits four different 140–143 entities to access the secured document 136. The four different entities 140–143 include two individual users and two group users, wherein the group users mean that everyone in a group could access the document with the same privileges. The two individual users have two different access privileges. User A can only read the document while user D can edit and read the document. While everyone in Group B can read and edit the document, everyone in Group C can only print the document. Each entity has a corresponding ID to be associated with the corresponding users and its own access rules. According to one embodiment, the header 138 in the secured document 136 is partitioned into corresponding four sub-headers 140–143, each designated to one user or group and keeping a file key therein and encrypted with a separate user key. In other words, when User A is requesting the secured document 136, only the header 140 designated to User A is decrypted with a user key (e.g., key A) belonging to the user A and authenticated with the user, the rest of the sub-headers 141–143 remain encrypted. In any case, once one of the sub-headers 141–143 is decrypted, the secured document can be decrypted with a key (e.g., file key) retrieved from the decrypted sub-header.

Figure 2D:
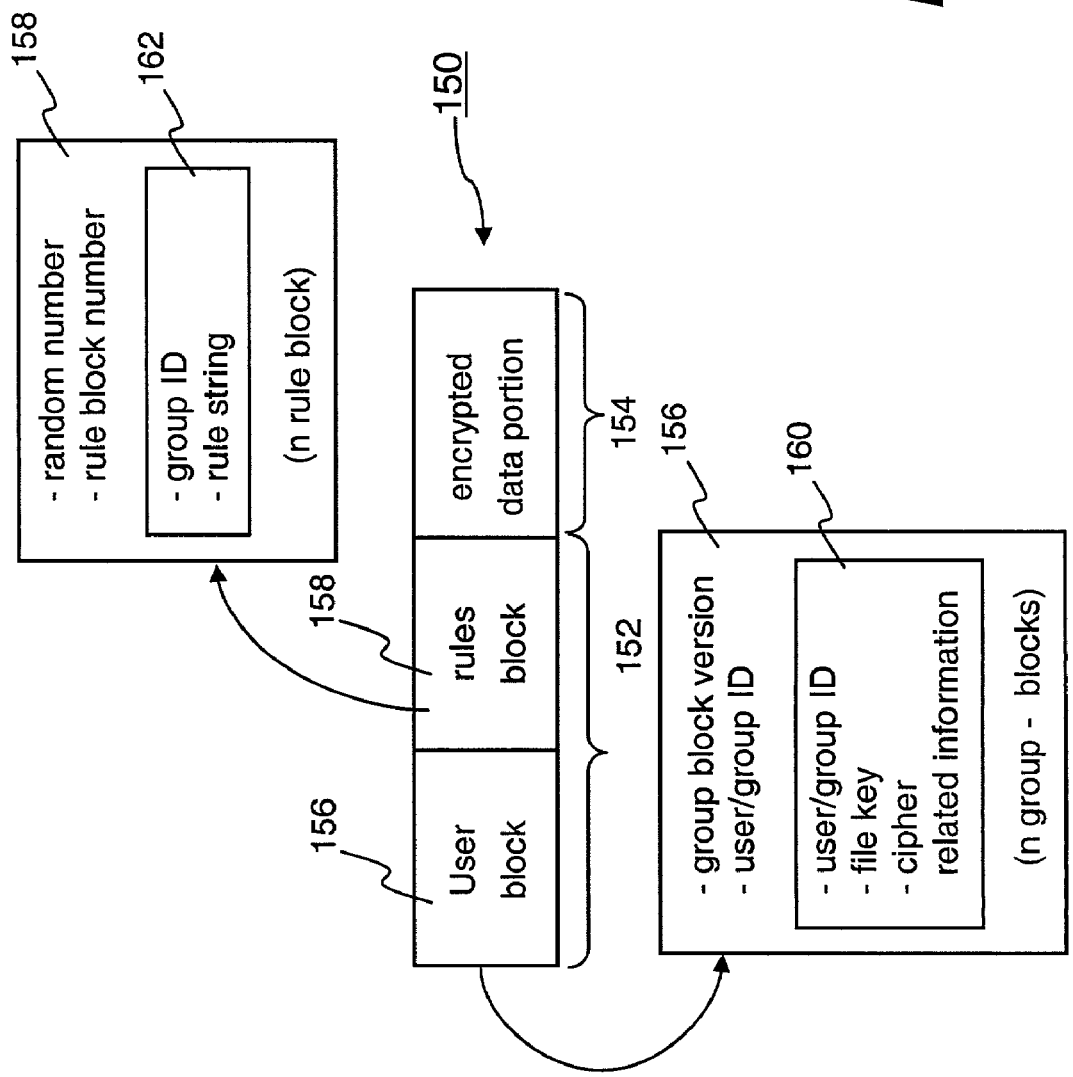
FIG. 2D illustrates another exemplary structure of a secured document including a header and an encrypted portion, wherein the header further includes a user block and a rules block.

FIG. 2D illustrates another exemplary structure of a secured document 150 including a header 152 and an encrypted portion 154. The header 152 further includes a user block 156 and a rules block 158. The user block 156 includes a clear portion and an encrypted portion 160. The clear portion includes user/group ID(s) and block version number(s). The encrypted portion 160 is encrypted with a user key according to a cipher. If there are N number of distinctive groups/users with possible different access privileges, there will be N such encrypted portions, each encrypted with a corresponding user key. The encrypted portion 160 includes, among other things, the file key that, once retrieved, can be used to decrypt the encrypted data portion 154. In addition, the encrypted portion 160 includes the cipher information to facilitate the encryption/decryption of the encrypted portion 154.

The rules block 158 can be encrypted individually or with the encrypted document 154 using the file key that is eventually stored in the user block 156. One of the advantages of using the file key instead of the individual user key to encrypt the rules block 158 is to provide a mechanism for all authorized users/groups to view who has what access rules and rights. According to one embodiment, a random number or a result from an initialization process (e.g. a vector) may be added in the beginning of the rules block 158 to prevent an attack against the rules block 158.

FIG. 2E shows an exemplary header 166 corresponding to that of the secured document structure in FIG. 2D. The header 166 includes a number of segments. In addition to those segments in clear mode, segments 167–169 are encrypted. Specifically, the secured file is configured to be accessed by two groups: marketing and engineering. All users in the two groups are supposed to be able to access the file with an authenticated user key. According to one embodiment, the segment 167 is encrypted with a user key specifically designated to marketing users, while the segment 168 is encrypted with a user key specifically designated to engineering. However, both of the segments 167 and 168 could be respectively encrypted with a single user key. In any event, the encrypted segments in the header 166 include a file key 170 in addition to corresponding cipher information about the cipher being used.

The rules block (i.e., a segment) 169 includes two sets 171 and 172 of access rules (details on rules not shown), one for each of the two user groups. The rules block 169 is encrypted with a key, such as the file key 170 or some other key depending on what cipher is used. According to one embodiment, one of the encrypted segments in the user blocks 167 and 168 shall be decrypted 169 with an authenticated user key to retrieve the file key 170. Before the file key 170 is applied to the decryption of the encrypted data portion, the rules block 169 is decrypted with the file key 170. The access rules are then measured against the access privilege of the user. If the user is not permitted to access the secured document, the file key 170 will not be applied to the decryption of the encrypted data portion. If the user is permitted to access the secured document, the file key 170 will then be applied to the decryption of the encrypted data portion.

In an alternative implementation, the file key necessary to decrypt the document may be encrypted alone and kept in a separate block in the header. The file key becomes retrievable when one of the sub-headers (no longer keeping the file key) is decrypted. In still another alternative implementation, one or more flags or messages may be included in the security information of a secured document, the flags or messages indicate how secure the secured document can be. For example, a secured document can be classified as a normal, confidential, secret or a top-secret document, requiring different level of access. Accordingly, multiple-levels of encryption on the file key and/or access rules may be employed to ensure that only an authorized user or users are permitted to access the secured document.

It should be noted that FIGS. 2B, 2C, 2D and 2E are only exemplary structures of a secured document. Each of the structures can be readily modified by those skilled in the art to introduce more features in a secured file. One feature that may be desirable is to introduce a level of security in a secured file. For example, a file key can be further encrypted by a clearance key that correspond to a level of security. For example, a "top secret" document can be only accessed by those who also can also access a clearance key. In general, a level of security may include, but not be limited to, "top secret", "secret", and "confidential". Alternatively, the level of security to a file may utilize a visually self-explanatory object or graphic art. In any case, such a level of security can be readily implemented in one of the structures illustrated in FIG. 2B, 2C, 2D or 2E. For example, an indication may be placed in the unencrypted portion of the header shown in FIG. 2E.

Figure 3:
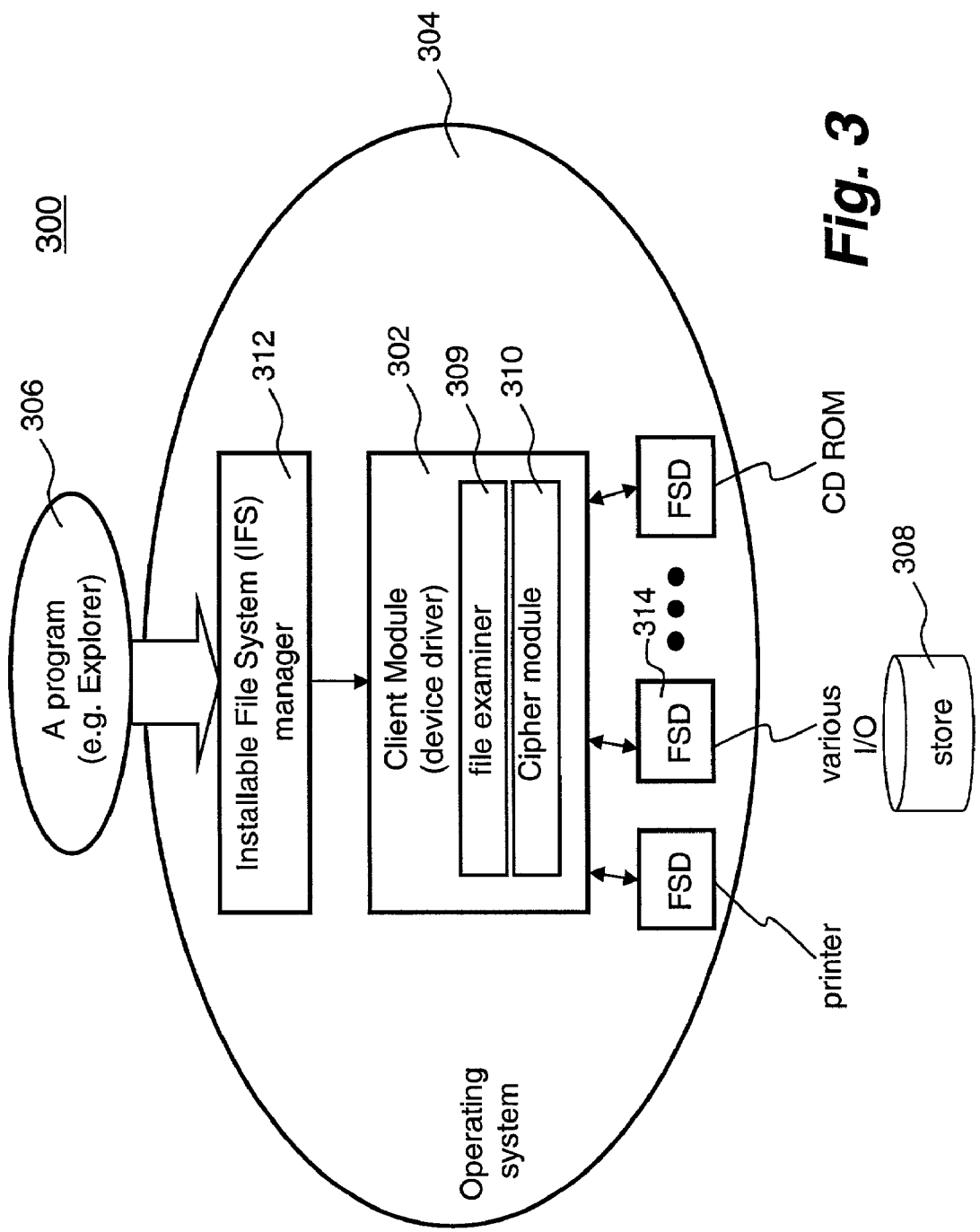
FIG. 3 shows an exemplary implementation of detecting one or more secured files and superimposing appropriate icons over default icons associated with secured files.

FIG. 3 shows an exemplary implementation 300 of the present invention. A client module 302 representing an executable version of the present invention includes a file examiner 309 and a cipher module 310. The file examiner 309 is configured to examine if a file is secured or non-secured (i.e., a regular file) and the cipher module 310 is configured to convert a secured file into a clear version (e.g., non-secured) when a user is authenticated and permitted to access the secured file.

According to one embodiment, the client module 302 is configured to interact with and operate within an operating system 304 (e.g., Microsoft Windows 2000/NT/XP). One of the features of the client module 302 is that the operations thereof are transparent to the user. In other words, the user is not made aware of the operations of the client module 302 when accessing a secured document.

A program 306 (e.g. Microsoft Internet Explorer or a Windows explorer in a Microsoft Windows environment) may be activated by a user to display contents in a selected place (e.g. a folder). In general, there may be all sorts of files in a selected place (e.g., store 308), such as PDF, MS Word, Notepad and Executable. Each of the files can be associated with a default icon, an image representation from which a user can immediately tell what format the file is and what application is associated with the file. As a result, the default icon and the file name of each of the contents are displayed in the program 306. When a user selects either a default icon or a file name, an associated program is activated to act on the file.

The store 308 may be a local storage place (e.g., hard disk) or remotely located (e.g., another device). When the store 308 or a directory or folder therein is selected by the program 306, files therein are pulled and intercepted by the client module 302 that checks if any of the files are secured. Depending on an exact format for a secured file, there are possible ways to detect if a particular file is secured or not. One of the ways is to look for a security signature in a secured file. The format illustrated in FIG. 1B employs a flag that is typically embedded at the beginning of a secured file. Once the flag is detected, it can be determined that the file is secured. Another possible way is to look for a file structure that is unusual. For example, a Word document has a known file structure while a secured Word document has a structure different from the regular Word file structure. Those skilled in the art can design many other ways to determine secured files from those non-secured files.

For those files that are determined "secured", the client module 302 activates the file examiner 309 that looks into a secured file to determine if it has any indicating of security level. As indicated above, some secured files have a build-in security level so that only those whose security clearance is cleared can access those "top secret" files. In general, depending on a file's extension name, a default icon is associated with the file. At the same time, it is desirable not to alter the file's extension name even the file have been secured. One of the functions provided by the client module 302 is to facilitate superimposing an appropriate icon onto the default icon of the secured file before the metadata (e.g. icon or superimposed icon, size and file name) of the file continues to be pulled into the program 306 for display. For example, with each new release of Windows OS, its shell becomes more and more advanced and adds many new useful features. One of the ways this is done is through shell extensions. These extensions allow developers to add functionality to the existing Windows shell. Specifically, the program 306 in a Windows OS can be provided with one or more Dynamic Link Libraries (DLL) that are configured to include a plurality of exemplary customized icons. When the client module 302 detects that at least one of files in a selected place are secured and all respective icons for the files are to be displayed in a display window by the program 306, the program 306 invokes the Dynamic Link Libraries in response to shell-wide events to cause one of the exemplary customized icons to be overlaid onto a corresponding default icon of the file that has been detected to be in secured format.

According to one embodiment, the client module 302 is analogous in many ways to a device driver that essentially converts more general input/output instructions of an operating system to messages that a device/module being supported can understand. Depending on the OS in which the present invention is implemented, the client module 302 may be implemented as a VxD (virtual device driver), a kernel or other applicable format. The file examiner 309 and the cipher module 310 are included in or controlled by the client module 302 and can be activated for operations when a secured document is involved.

Figure 4C:
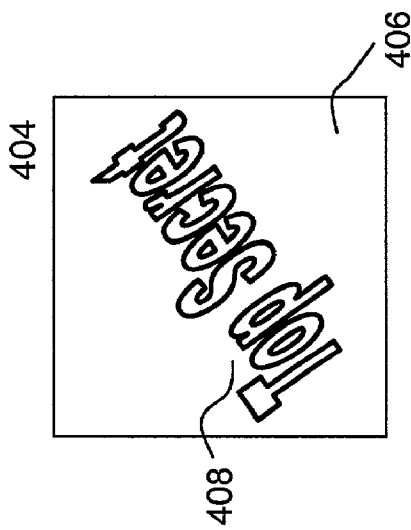
FIG. 4B and FIG. 4C show, respectively, two exemplary customized icons and that may be used for those files that have been identified as secured.
Figure 4B:
Figure 4E:
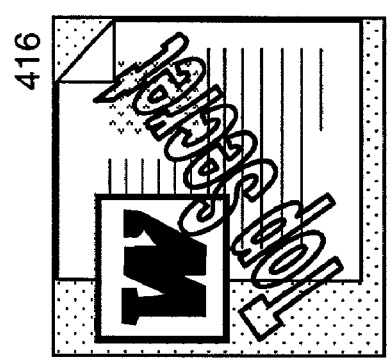
FIG. 4D and FIG. 4E show, respectively, two corresponding superimposed icons, each having the object from the icon in FIG. 4B or FIG. 4C superimposed over the default icon in FIG. 4A.
Figure 4A:
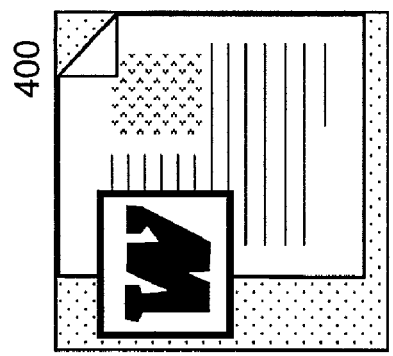
FIG. 4A shows an exemplary standard default icon commonly associated with a Word document or a file with an extension name "doc"
Figure 4D:
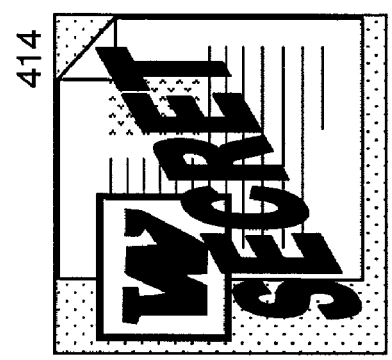

FIG. 4A shows an exemplary standard default icon 400 commonly associated with a Word document or a file with an extension name "doc". To use a standard icon in Microsoft Windows environment, a program can obtain its handle by using the LoadImage function. An icon handle is a unique value of the HICON type in WIN 32 that identifies a standard or custom icon. FIG. 4B and FIG. 4C show, respectively, two exemplary customized icons 402 and 404 that may be used for those files that have been identified as secured. One of the important features in the two icons 402 and 404 is that the backgrounds 406 and 412 are transparent. In other words, each of the icons 402 and 404 has an object 408 or 410 that is, preferably, self-indicated and indicates the nature of a secured file. FIG. 4D and FIG. 4E show, respectively, two corresponding superimposed icons 414 and 416, each having the object from the icon 402 or 404 superimposed over the default icon 400. Generally, at run-time in Microsoft Windows environment, a program (e.g. the client module 402 of FIG. 3) can call LoadIcon or LoadImage to retrieve a handle to a customized icon (e.g. 402 or 404).

As one of the features in the present invention, an object in a selected icon to be associated with a secured file is superimposed onto a default icon in such a way that the meaning or indication of the original icon is not obscured or lost. In other words, a user, when seeing a superimposed icon, readily knows what format the corresponding file is, or what application or program can be activated to act on the file, except that the user also knows that the file is now secured or under protection.

Referring now to FIG. 5, there is shown a flowchart of a process 500 for indicating graphically secured files in a selected place that may be, but not limited to, a directory, a device and a folder. As indicated above, many graphic windows environments (e.g. Microsoft Windows XP) provide a utility tool for users to view contents in a selected place. The common tools or programs in Microsoft Windows XP are Internet Explorer and Windows Explorer.

Accordingly, at 502, the process 500 awaits a program to be activated. When the program, such as Windows Explorer, is activated by a user to see a particular folder, a request from the program is generated at 504 to fetch or pull the contents in the particular folder. At 506, the contents are intercepted on the way to the program for display in a display window. At 508, the files are checked to determine any of the files are secured. If none of the files are secured, in other words, every thing in the folder is "normal", or non-secured, the process 500 goes to 518 to display standard icons along with file names for the contents in the display window.

Conversely, if the outcome from 508 is that at least one of the files are secured, the process goes to 510 to determine if the secured file or files have any indication of security level. Some secured files may be classified as top secret, secret or confidential and other are not. If there is such indication in some of the secured files, the process 500 goes to 514 to select respective and appropriate customized icons for those secured files. As described above, each of the customized icons includes an object and a transparent background. The object may be a word, a text, a sign or a graphic art. In a preferred embodiment, the object itself is a self-explanatory sign, such as secret, confidential or top secret. At 516, the customized icons are respectively superimposed or integrated with the default icons of those files determined secured and having an indication of security level.

However, at the same time, if the outcome from 510 turns out that there is no indication of security level in some of the secured files. According to the fact that these files are secured or types of secured nature of these files, appropriate customized icons are selected therefor. In a preferred embodiment, each of the appropriate customized icons is a self-explanatory sign, such as encrypted or secret. The process 500 continues to 516, wherein the customized icons are respectively superimposed or integrated with the default icons of those files determined secured and with an indication of security level.

In any case, the default icons as well as the superimposed icons are displayed next to the file names in the display window by the program at 518. Different from the prior art solutions, each of the superimposed icons is not constructed in any way to obscure the original meaning or indication of the corresponding default icon. As a result, a user can still readily tell what file a file name indicates and what application shall be activated to act on the file but also is made aware that the file is now secured.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for graphically indicating secured items in a program for displaying contents in a selected place, the method comprising:
   determining a security level of each of the secured items, wherein each of the secured items has a default icon associated with if the each of the secured items is otherwise not secured; and
   superimposing an appropriate icon corresponding to the security level over the default icon without losing original indications of the default icon.

2. The method as recited in claim 1 further comprising:
   intercepting files from the selected place when the files are selected by the program for displaying the contents in the selected place; and
   checking if any of the secured items are included in the files.

3. The method as recited in claim 2, wherein said determining a security level of each of the secured items comprises activating a client module when said checking indicates that there are at lease one of the secured items is included in the files.

4. The method as recited in claim 3, wherein the client module operates in a operating system supporting the program.

5. The method as recited in claim 4, wherein the selected place is a folder and the operating system is a graphic windows operating system and the program is a utility for a user to display the contents in the folder.

6. The method as recited in claim 3, wherein the client module is configured to look into security information associated with the at least one of the secured items, and wherein the security information includes information regarding the security level of the at least one of the secured items.

7. The method as recited in claim 6, wherein the security level includes at least one level to indicate that the at least one of the secured items is secured, differentiating from the rest of the files.

8. The method as recited in claim 1, wherein the default icon is associated with an executable program, when the each of the secured items or the default icon thereof is clicked, the executable program will be activated.

9. The method as recited in claim 1, wherein the appropriate icon includes a visual object and a transparent background.

10. The method as recited in claim 9, wherein said superimposing an appropriate icon corresponding to the security level over the default icon comprises overlaying the visual object onto the default icon without obscuring the rest of the default icon.

11. The method as recited in claim 9, wherein said superimposing an appropriate icon corresponding to the security level over the default icon comprises generating a superimposed icon including the default icon with the visual object superimposed thereon without obscuring the rest of the default icon.

12. The method as recited in claim 10, wherein the default icon is associated with an executable program, when the each of the secured items or the superimposed icon thereof is clicked, the obscuring program will be activated.

13. The method as recited in claim 1, wherein said superimposing an appropriate icon corresponding to the security level over the default icon comprises:
   resizing the appropriate icon according to a size of the default icon; and
   overlaying the resized appropriate icon onto the default icon without obscuring the rest of the default icon.

14. A method for graphically indicating secured items in a program for displaying contents in a selected place, the method comprising:
   retrieving all files in the selected place;
   intercepting the files when metadata of the files are being loaded into the program;
   checking if there is at least one of the secured items included in the files;
   activating a client module to determine how the at least one of the secured items is secured, when it is checked that the at least one of the secured items is included in the files; and
   generating a superimposed icon to indicate the at least one of the secured items is secured, different from the rest of the files when displayed in the program.

15. The method as recited in claim 14, wherein there is an appropriate icon for the at least one of the secured items when the at least one of the secured items is not secured, and wherein said generating a superimposed icon comprises:
   choosing an appropriate icon for the at least one of the secured items; and
   superimposing the appropriate icon over the default icon associated with, without losing original indications of the default icon.

16. The method as recited in claim 15, wherein the appropriate icon includes a visual object and a transparent background.

17. The method as recited in claim 16, wherein said superimposing the appropriate icon over the default icon comprises overlaying the visual object onto the default icon without obscuring the rest of the default icon.

18. A computer for graphically indicating secured items in a program for displaying contents in a selected place, the computer comprising:
   at least a processor;
   a first memory space for storing a client module;
   a second memory space, coupled to the processor, for storing code as a graphic operating system, the code, when executed by the processor, causing the graphic operating system to support the program for displaying the contents in the selected place and perform operations of:
   retrieving all files in the selected place;
   checking if there is at least one of the secured items included in the files;
   activating the client module to determine how the at least one of the secured items is secured, when it is checked that the at least one of the secured items is included in the files; and
   generating a superimposed icon to indicate the at least one of the secured items is secured, different from the rest of the files when displayed in the program.

19. The computer as recited in claim 18, wherein there is an appropriate icon for the at least one of the secured items when the at least one of the secured items is not secured, and wherein said generating a superimposed icon comprises:

choosing an appropriate icon for the at least one of the secured items; and superimposing the appropriate icon over the default icon associated with, without losing original indications of the default icon.

20. The method as recited in claim 19, wherein the appropriate icon includes a visual object and a transparent background.

21. The method as recited in claim 20, wherein said superimposing the appropriate icon over the default icon comprises overlaying the visual object onto the default icon without obscuring the rest of the default icon.

22. A computer readable medium containing program code executable by a computing device for graphically indicating secured items in a program for displaying contents in a selected place, the computer readable medium comprising:

program code for determining a security level of each of the secured items, wherein each of the secured items has a default icon associated with if the each of the secured items is otherwise not secured; and program code for superimposing an appropriate icon corresponding to the security level over the default icon without losing original indications of the default icon.

23. The computer readable medium as recited in claim 22 further comprising:

program code for intercepting files from the selected place when the files are selected by the program for displaying the contents in the selected place; and program code for checking if any of the secured items are included in the files.

24. The computer readable medium as recited in claim 23, wherein the program code for determining the security level of the each of the secured items comprises program code for activating a client module when the program code for checking indicates that there are at lease one of the secured items is included in the files.

25. The computer readable medium as recited in claim 24, wherein the client module is configured to look into security information associated with the at least one of the secured items, and wherein the security information includes information regarding the security level of the at least one of the secured items.

26. The computer readable medium as recited in claim 22, wherein the default icon is associated with an executable program, when the each of the secured items or the default icon thereof is clicked, the executable program will be activated.

27. The computer readable medium as recited in claim 22, wherein the appropriate icon includes a visual object and a transparent background.

28. The computer readable medium as recited in claim 27, wherein the program code for superimposing the appropriate icon corresponding to the security level over the default icon comprises program code for overlaying the visual object onto the default icon without obscuring the rest of the default icon.

29. The computer readable medium as recited in claim 27, wherein the program code for superimposing the appropriate icon corresponding to the security level over the default icon comprises program code for generating a superimposed icon including the default icon with the visual object superimposed thereon without obscuring the rest of the default icon.

30. The computer readable medium as recited in claim 29, wherein the default icon is associated with an executable program, when the each of the secured items or the superimposed icon thereof is clicked, the obscuring program will be activated.

31. The computer readable medium as recited in claim 22, wherein the program code for superimposing the appropriate icon corresponding to the security level over the default icon comprises:

program code for resizing the appropriate icon according to a size of the default icon; and program code for overlaying the resized appropriate icon onto the default icon without obscuring the rest of the default icon.

32. A computer readable medium containing program code executable by a computing device for graphically indicating secured items in a program for displaying contents in a selected place, the computer readable medium comprising:

program code for retrieving all files in the selected place;

program code for intercepting the files when metadata of the files are being loaded into the program;

program code for checking if there is at least one of the secured items included in the files;

program code for activating a client module to determine how the at least one of the secured items is secured, when it is checked that the at least one of the secured items is included in the files; and program code for generating a superimposed icon to indicate the at least one of the secured items is secured, different from the rest of the files when displayed in the program.

33. The computer readable medium as recited in claim 32, wherein there is an appropriate icon for the at least one of the secured items when the at least one of the secured items is not secured, and wherein the program code for generating the superimposed icon comprises:

program code for choosing an appropriate icon for the at least one of the secured items; and program code for superimposing the appropriate icon over the default icon associated with, without losing original indications of the default icon.

34. The method as recited in claim 33, wherein the appropriate icon includes a visual object and a transparent background.

35. The method as recited in claim 34, wherein the program code for superimposing the appropriate icon over the default icon comprises program code for overlaying the visual object onto the default icon without obscuring the rest of the default icon.

* * * * *